US009824598B2

(12) United States Patent
Onomura et al.

(10) Patent No.: US 9,824,598 B2
(45) Date of Patent: Nov. 21, 2017

(54) FLIGHT HINDRANCE DISPLAY APPARATUS, FLIGHT HINDRANCE DISPLAY METHOD, AND COMPUTER-READABLE MEDIUM

(71) Applicant: SUBARU CORPORATION, Tokyo (JP)

(72) Inventors: Yoichi Onomura, Tokyo (JP); Shinei Takahashi, Tokyo (JP); Yu Itabashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/405,507

(22) Filed: Jan. 13, 2017

(65) Prior Publication Data

US 2017/0270808 A1 Sep. 21, 2017

(30) Foreign Application Priority Data

Mar. 18, 2016 (JP) ................................. 2016-055163

(51) Int. Cl.
*G08G 5/04* (2006.01)
*H04N 13/04* (2006.01)
*G01S 13/93* (2006.01)
*G08G 5/00* (2006.01)

(52) U.S. Cl.
CPC ............ *G08G 5/04* (2013.01); *G01S 13/9303* (2013.01); *G08G 5/0021* (2013.01); *G08G 5/0078* (2013.01); *G08G 5/045* (2013.01); *H04N 13/0402* (2013.01)

(58) Field of Classification Search
CPC ........ G08G 5/04; G08G 5/045; G08G 5/0021; G08G 5/0078; G08G 5/0008; G01S 13/9303; H04N 13/0402
USPC ........................................................ 340/961
See application file for complete search history.

(56) References Cited

U.S. PATENT DOCUMENTS

| 6,054,937 A | * | 4/2000 | Von Viebahn | ....... G01C 23/005 340/961 |
| 7,346,437 B2 | * | 3/2008 | Petillon | ................ G08G 5/0078 701/10 |
| 8,576,093 B2 | * | 11/2013 | Flotte | ..................... G08G 5/045 340/961 |

(Continued)

FOREIGN PATENT DOCUMENTS

JP 2002-312900 A 10/2002

*Primary Examiner* — John A Tweel, Jr.
(74) *Attorney, Agent, or Firm* — McDermott Will & Emery LLP

(57) ABSTRACT

A flight hindrance display apparatus includes circuitry. The circuitry is configured to acquire surrounding information of an aircraft. The surrounding information is related to a hindrance factor which is a possible flight hindrance to the aircraft. The circuitry is configured to determine a spatial range of the flight hindrance factor on a basis of the acquired surrounding information. The circuitry is configured to determine a flight hindrance cross-section that intersects a plane including a vector of a flight direction of the aircraft and is included in the determined spatial range of the flight hindrance factor. The circuitry is configured to cause a display unit to stereoscopically display an own position of the aircraft, the spatial range of the flight hindrance factor, and the flight hindrance cross-section.

18 Claims, 4 Drawing Sheets

(56) References Cited

U.S. PATENT DOCUMENTS

| 9,396,662 B2* | 7/2016 | Bousquet | G08G 5/0078 |
| 2015/0194060 A1* | 7/2015 | Mannon | G08G 5/0078 |
| | | | 701/301 |

* cited by examiner

FLIGHT HINDRANCE DISPLAY APPARATUS, FLIGHT HINDRANCE DISPLAY METHOD, AND COMPUTER-READABLE MEDIUM

CROSS-REFERENCE TO RELATED APPLICATIONS

The present application claims priority from Japanese Patent Application No. 2016-055163 filed on Mar. 18, 2016, the entire contents of which are hereby incorporated by reference.

BACKGROUND

The technology relates to a technique of displaying a flight hindrance factor that is a possible flight hindrance to an aircraft. In particular, the technology relates to a technique that is advantageous for enhancing recognizability of a pilot to recognize the flight hindrance factor.

Upon steering an aircraft, it is necessary to allow a pilot to recognize a flight hindrance factor such as, but not limited to, other aircrafts and bad weather so as to properly avoid the flight hindrance factor.

Non-limiting examples of a display method for allowing the pilot to recognize the flight hindrance factor may include a method of projecting the flight hindrance factor onto a horizontal plane and a vertical plane to display the two projected screens and a method of stereoscopically displaying the flight hindrance factor as a projection with a depth as disclosed in Japanese Unexamined Patent Application Publication (JP-A) No. 2002-312900, for example.

SUMMARY

However, it has been necessary for a pilot to see two projected screens for comprehensive determination in the former method, whereas it has been difficult for the pilot to grasp a sense of distance due to a simple projection display in the latter method.

It is desirable to enhance recognizability of the pilot to recognize a flight hindrance factor.

An aspect of the technology provides a flight hindrance display apparatus that includes circuitry. The circuitry is configured to acquire surrounding information of an aircraft. The surrounding information is related to a hindrance factor which is a possible flight hindrance to the aircraft. The circuitry is configured to determine a spatial range of the flight hindrance factor on a basis of the acquired surrounding information. The circuitry is configured to determine a flight hindrance cross-section that intersects a plane including a vector of a flight direction of the aircraft and is included in the determined spatial range of the flight hindrance factor. The circuitry is configured to cause a display unit to stereoscopically display an own position of the aircraft, the spatial range of the flight hindrance factor, and the flight hindrance cross-section.

The surrounding information acquired may include future prediction information. The spatial range of the flight hindrance factor may be determined at respective times from a current time to a predetermined future time. The flight hindrance cross-section may be determined at the respective times from the current time to the predetermined future time. The display unit may be caused to display the own position of the aircraft, the spatial range of the flight hindrance factor, and the flight hindrance cross-section at a predetermined time out of the respective times from the current time to the predetermined future time.

The spatial range of the flight hindrance factor may be divided into a plurality of regions depending on a risk that affects flight of the aircraft. The display unit may be caused to display the spatial range of the flight hindrance factor while expressing the plurality of regions in display states different from one another.

The display unit may be caused to display the plane including the vector of the flight direction of the aircraft in a grid state divided with a plurality of grid lines in a traveling direction of the aircraft and a direction orthogonal to the traveling direction of the aircraft.

The display unit is caused to display, as the three-dimensional image, a display content including the own position of the aircraft, the spatial range of the flight hindrance factor, and the flight hindrance cross-section.

The flight hindrance factor may be one or more of any other aircraft, bad weather, and a no-fly zone.

Another aspect of the technology provides a flight hindrance display method that includes: acquiring surrounding information of the aircraft, the surrounding information being related to a flight hindrance factor which is a possible flight hindrance to an aircraft; determining a spatial range of the flight hindrance factor on a basis of the acquired surrounding information; determining a flight hindrance cross-section that intersects a plane including a vector of a flight direction of the aircraft and is included in the determined spatial range of the flight hindrance factor; and causing a display unit to stereoscopically display an own position of the aircraft, the spatial range of the flight hindrance factor, and the flight hindrance cross-section.

Another aspect of the technology provides a non-transitory tangible computer readable medium having a flight hindrance factor program. When executed by a flight hindrance display apparatus, the program causes the flight hindrance display apparatus to function as an information acquiring unit, a range determining unit, a cross-section determining unit, and a display controller. The information acquiring unit acquires surrounding information of an aircraft related to a flight hindrance factor which is a possible flight hindrance to the aircraft. The range determining unit determines a spatial range of the flight hindrance factor on a basis of the surrounding information acquired by the information acquiring unit. The cross-section determining unit determines a flight hindrance cross-section that intersects a plane including a vector of a flight direction of the aircraft and is included in the spatial range of the flight hindrance factor determined by the range determining unit. The display controller causes a display unit to stereoscopically display an own position of the aircraft, the spatial range of the flight hindrance factor, and the flight hindrance cross-section.

DETAILED DESCRIPTION

A description is given below, with reference to the accompanying drawings, of some implementations in which a flight hindrance display apparatus according to an implementation of the technology is applied to an aircraft 1.

[Configuration]

First, a configuration of the aircraft 1 according to an implementation is described with reference to FIG. 1.

Figure 1:
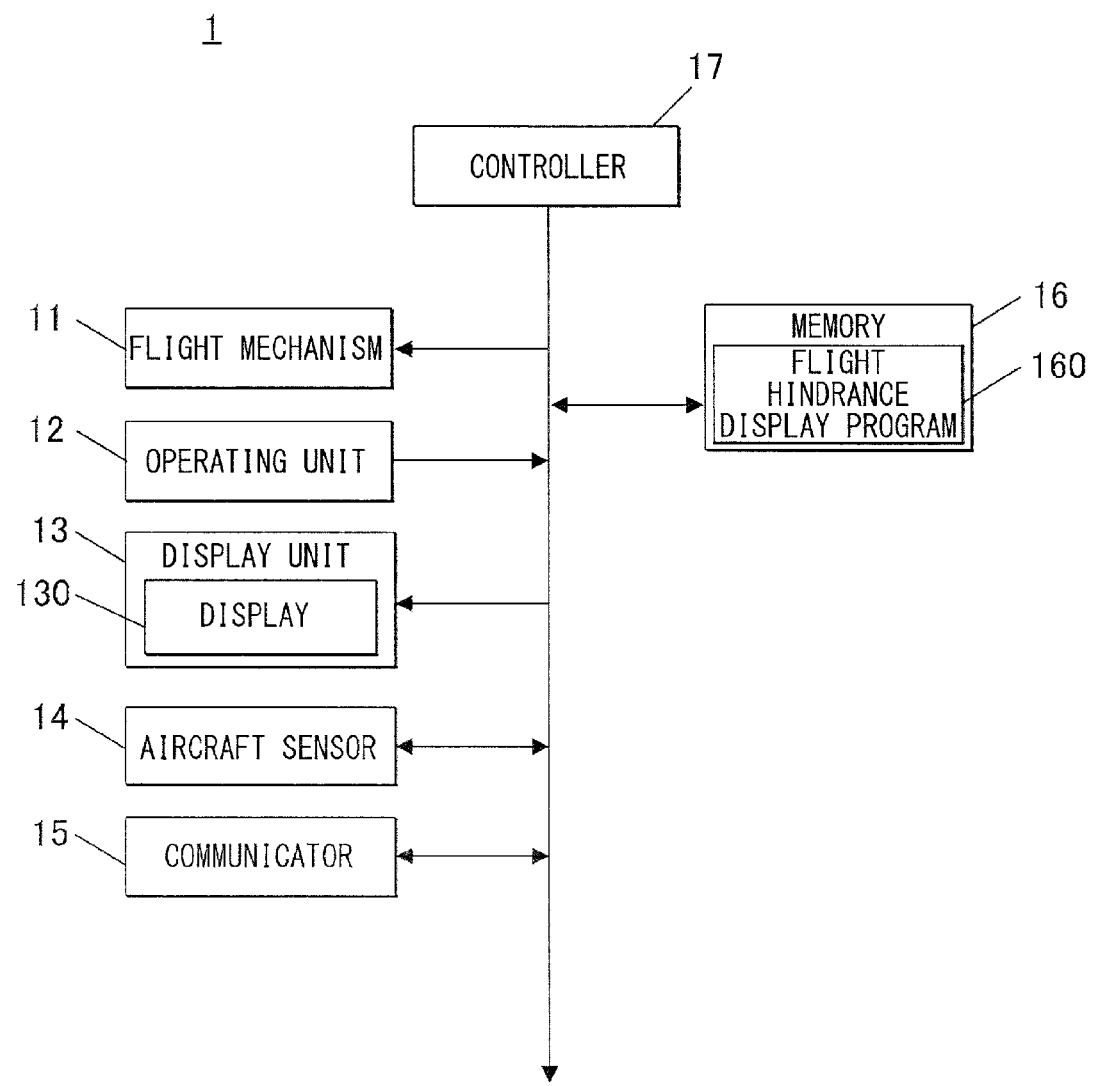
FIG. 1 is a block diagram illustrating an example of an outline configuration of an aircraft according to an implementation of the technology.

FIG. 1 is a block diagram illustrating an example of an outline configuration of the aircraft 1.

The aircraft 1 provided with the flight hindrance display apparatus according to an implementation of the technology may enable a flight hindrance factor which is a possible flight hindrance to an own aircraft (aircraft 1) to be easily recognizable by a pilot.

More specifically, the aircraft 1 may include a flight mechanism 11, an operating unit 12, a display unit 13, an aircraft sensor 14, a communicator 15, a memory 16, and a controller 17, as illustrated in FIG. 1. In one implementation, the display unit 13, the aircraft sensor 14, the communicator 15, the memory 16, and the controller 17 may serve as a "flight hindrance display apparatus".

Among these units, the flight mechanism 11 may allow the aircraft 1 to fly. The flight mechanism 11 may include components such as an internal combustion engine that generates propulsion and an actuator that drives a control surface. The internal combustion engine may be a jet engine, for example.

The operating unit 12 may be provided with components such as a control stick and various operation keys to be operated by the pilot, and may supply signals, to the controller 17, corresponding to the states of operations of the components such as the control stick and the various operation keys.

The display unit 13 may notify the pilot of various pieces of information on the basis of, for example, display signals supplied from the controller 17, and may include a display 130 that displays a surrounding situation of the aircraft 1 besides unillustrated meters indicating various pieces of information of the aircraft.

The display 130 may be a display that allows for display of a three-dimensional image (stereoscopically-viewed image) in the present implementation.

The aircraft sensor 14 may include various sensors such as a sensor that detects a flight state of the aircraft 1 and a sensor that acquires information on the surrounding situation (hereinafter, referred to as "surrounding information") of the aircraft 1. The aircraft sensor 14 may include, for example, a radar, an image sensor (a camera), a gyroscope, a velocity sensor, a global positioning system (GPS), and a traffic alert and collision avoidance system (TCAS). The aircraft sensor 14 may acquire various pieces of information on the basis of control instructions given by the controller 17, and supply a signal representing the acquired pieces of information to the controller 17.

The communicator 15 may communicate with a control facility on the ground, at the sea, or in the air. The communicator 15 may communicate with other aircraft, etc. The communicator 15 may transmit various signals to and receive various signals from the foregoing control facility, other aircraft, etc. Further, the communicator 15 may be accessible to various pieces of information through connection to a communication network.

Further, the communicator 15 may transmit and receive an automatic dependent surveillance-broadcast (ADS-B) signal including various pieces of information such as an identifier, a current position, altitude, and airspeed.

The memory 16 may store a program, data, etc., that are used to achieve various functions of the aircraft 1. The memory 16 may also serve as a workspace. The memory 16 may store a flight hindrance display program 160 in the present implementation.

The flight hindrance display program 160 is a program that may cause the controller 17 to execute a flight hindrance display process which is described later.

The controller 17 may perform a central control of each unit included in the aircraft 1. More specifically, the controller 17 may perform a drive control of the flight mechanism 11, and thereby control the flight of the aircraft 1, for example. Further, the controller 17 may load the program stored in the memory 16, and thereby execute the various processes on the basis of the loaded program.

Figure 2:
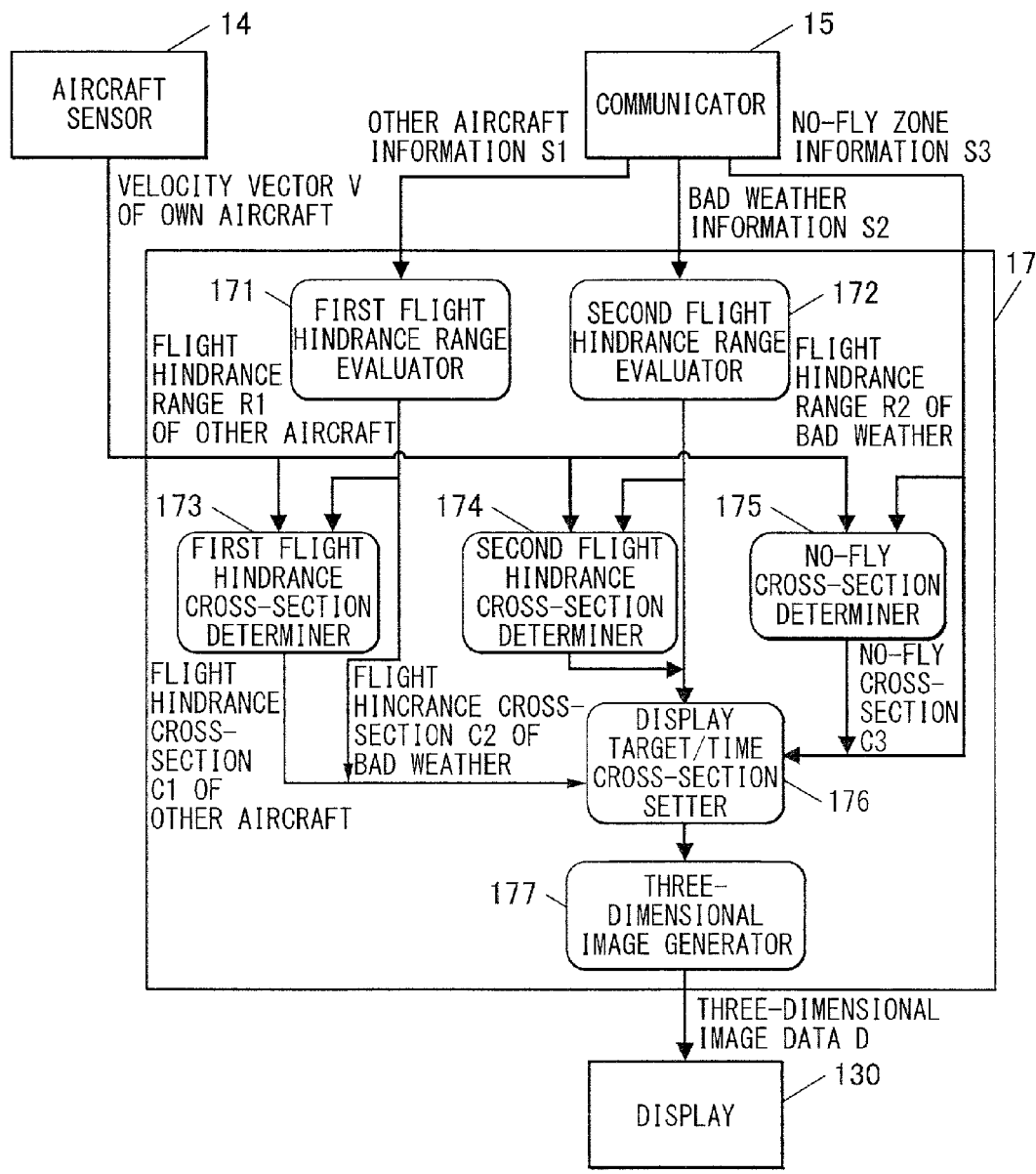
FIG. 2 is a data flowchart of an example of a flow of data in a flight hindrance display process.

Further, referring to FIG. 2, the controller 17 may include, as various function units in the flight hindrance display process, a first flight hindrance range evaluator 171, a second flight hindrance range evaluator 172, a first flight hindrance cross-section determiner 173, a second flight hindrance cross-section determiner 174, a no-fly cross-section determiner 175, a display target/time cross-section setter 176, and a three-dimensional image generator 177, as described later.

[Operation]

A description is now given of an operation of the aircraft 1 performed upon execution of the flight hindrance display process.

FIG. 2 is an example of a data flowchart of a flow of data in the flight hindrance display process. FIGS. 3A, 3B, 3C, and 4 each illustrate a display example of the display 130 in the flight hindrance display process.

The flight hindrance display process may cause the display 130 to display the flight hindrance factor that is a possible flight hindrance to the aircraft 1. The flight hindrance display process may be executed where appropriate during a flight in the present implementation. The controller 17 may read and load the flight hindrance display program 160 stored in the memory 16, and thereby execute the flight hindrance display process, upon reception of instructions to execute the flight hindrance display process through reception of an operation of the pilot, for example.

Figure 3A:
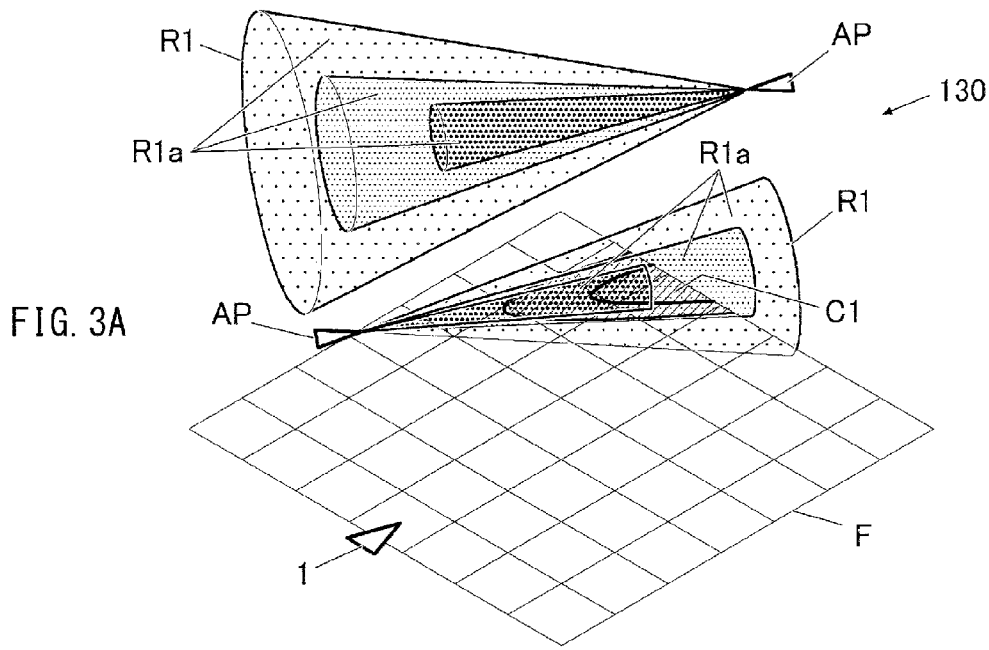
FIGS. 3A, 3B, and 3C each illustrate a display example of a display in the flight hindrance display process.
Figure 3B:
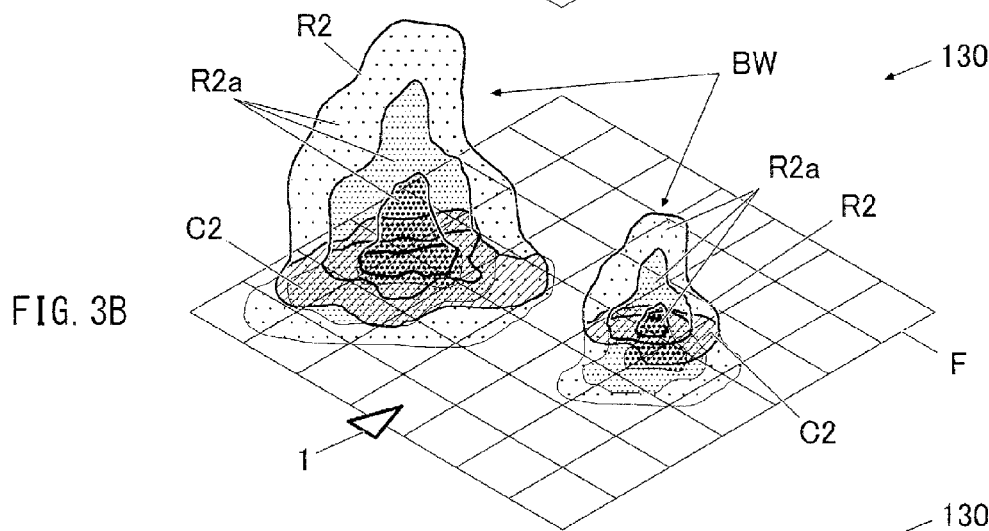
Figure 3C:
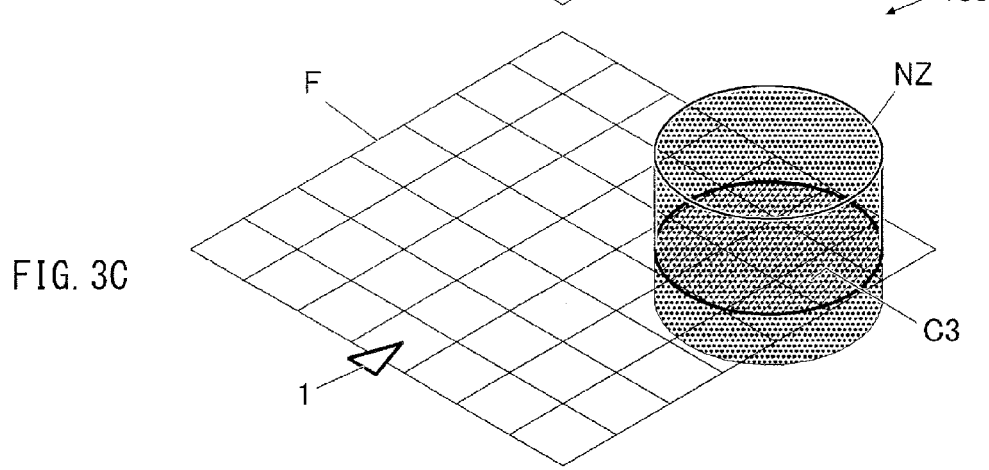

It is to be noted that three factors such as other aircraft AP, bad weather BW, and a no-fly zone NZ may be displayed as the flight hindrance factor in the present implementation as illustrated in FIGS. 3A to 3C. It is to be noted that, in this example, the aircraft 1 is presumed to be flying.

When the flight hindrance display process is executed, the controller 17 may first acquire information necessary for the flight hindrance display process.

More specifically, as illustrated in FIG. 2, the controller 17 may acquire flight information (velocity vector V) of the own aircraft (aircraft 1) with the aircraft sensor 14. Further, the controller 17 may acquire surrounding information of the own aircraft related to the three flight hindrance factors (other aircraft AP, bad weather BW, and no-fly zone NZ) with the communicator 15, and may store the acquired surrounding information in the memory 16.

More particularly, the controller 17 may acquire other aircraft information S1, bad weather information S2, and no-fly zone information S3 as the surrounding information related to the three flight hindrance factors. Other aircraft information S1 may include position, velocity, and flying direction of other aircraft. The bad weather information S2 may include a range of bad weather and degree of bad weather. The no-fly zone information S3 may include a no-fly range and valid time. Other aircraft information S1 may be acquired from the ADS-B signal. The bad weather information S2 may be acquired from a numerical weather forecast and significant meteorological information (SIG-MET: bad weather information) from a meteorological observatory, for example. The no-fly zone information S3 may be acquired from "Notice To Airmen" (NOTAM: various pieces of information related to aviation acquired from an aviation authority, etc.). Upon the acquisition of the surrounding information, it is possible to acquire not only current information, but also prediction information (future prediction information) at respective times from a current time to a predetermined future time for any of the surrounding information.

It is to be noted that a means to acquire the surrounding information related to each of the flight hindrance factors is not particularly limited as long as the means enables necessary information to be acquired. For example, information such as other aircraft information S1 and the bad weather information S2 either may be acquired with the aircraft sensor 14, or may be input (stored) in the memory 16 in advance.

Thereafter, the controller 17 may determine a spatial range (flight hindrance range) of each of the flight hindrance factors on the basis of each of the acquired pieces of surrounding information, and may generate a three-dimensional model of each of the spatial ranges.

In this example, the controller 17 may cause the first flight hindrance range evaluator 171 to determine a flight hindrance range R1 of the respective other aircrafts AP on the basis of other aircraft information S1 as illustrated in FIG. 3A. In addition, the controller 17 may cause the second flight hindrance range evaluator 172 to determine a flight hindrance range R2 of the respective bad weathers BW on the basis of the bad weather information S2 as illustrated in FIG. 3B. The controller 17 may determine the flight hindrance ranges R1 and R2 for each time (for each time cross-section) from a current time to a predetermined future time.

It is to be noted that the spatial range of the no-fly zone NZ is not needed to be determined because information on the no-fly range and the valid time thereof is included in the no-fly zone information S3.

More specifically, the first flight hindrance range evaluator 171 may determine a spatial range in which the respective other aircrafts AP may possibly fly during a predetermined time range from a certain time, as the flight hindrance range R1 of the respective other aircrafts AP at the certain time. This may determine, as the flight hindrance range R1 of other aircraft AP, a cone-shaped spatial range. In the cone-shaped spatial range, the position of this other aircraft AP is set as an apex, and the traveling direction thereof is set as a central axis.

Upon the determination of the spatial range, the first flight hindrance range evaluator 171 may divide the flight hindrance range R1 of other aircraft AP into a plurality of regions R1$a$ depending on the degree of the possibility of flight of this other aircraft AP, i.e., depending on a risk of this other aircraft AP that may affect flight of the aircraft 1. In FIG. 3A, the flight hindrance range R1 is divided into three regions R1$a$.

In contrast, the second flight hindrance range evaluator 172 may determine a spatial range in which the respective bad weathers BW may affect flight of the own aircraft, as the flight hindrance range R2 of the bad weather BW.

Upon the determination of the spatial range, the second flight hindrance range evaluator 172 may divide the flight hindrance range R2 of the bad weather BW into a plurality of regions R2$a$ depending on the degree of the bad weather, i.e., depending on a risk of the bad weather BW that may affect the flight of the aircraft 1. In FIG. 3B, the flight hindrance range R2 is divided into three regions R2$a$.

Thereafter, the controller 17 may determine, among each of the flight hindrance ranges, the flight hindrance cross-section that intersects an own aircraft flight plane F (see FIGS. 3A, 3B, and 3C) including a vector of a flight direction of the aircraft 1.

More specifically, the controller 17 may cause the first flight hindrance cross-section determiner 173 to determine, among the flight hindrance ranges R1 of the respective aircrafts AP, a flight hindrance cross-section C1 of other aircraft AP that intersects the own aircraft flight plane F, on the basis of the velocity vector V of the own aircraft and the flight hindrance range R1 of other aircraft AP.

Further, the controller 17 may cause the second flight hindrance cross-section determiner 174 to determine, among the flight hindrance ranges R2 of the respective bad weathers BW, the flight hindrance cross-section C2 of the bad weather BW that intersects the own aircraft flight plane F, on the basis of the velocity vector V of the own aircraft and the flight hindrance range R2 of the bad weather BW.

Moreover, the controller 17 may cause the no-fly cross-section determiner 175 to determine the no-fly cross-section C3 that intersects the own aircraft flight plane F and is included in the spatial range of the no-fly zone NZ, on the basis of the velocity vector V of the own aircraft and the no-fly zone information S3.

The controller 17 may determine the flight hindrance cross-sections C1 to C3 for each time (for each time cross-section) from a current time to a predetermined future time. Upon the determination of the flight hindrance cross-sections C1 to C3, the velocity vector V of the own aircraft in a future time may be predicted from flight schedule information of the aircraft 1.

Thereafter, the controller 17 may cause the display target/time cross-section setter 176 to set a type and a time (time cross-section) of the flight hindrance factors to be displayed by the display unit 13, on the basis of an input operation of the operating unit 12 performed by a pilot or an operator.

More specifically, in this example, the display target/time cross-section setter 176 may set one or more flight hindrance factors of other aircraft AP, the bad weather BW, and the no-fly zone NZ as well as a time from a current time to a predetermined future time.

Thereafter, the controller 17 may cause the three-dimensional image generator 177 to generate three-dimensional image (stereoscopically-viewed image) data D that is used for causing the display 130 to display a set display content.

More specifically, the three-dimensional image generator 177 may generate three-dimensional image data D indicating a relationship of the time set to be displayed as well as the flight hindrance range and the flight hindrance cross-section which are set to be displayed, with respect to the own position of the aircraft 1 at the time and the own aircraft flight plane F.

Upon the generation of the three-dimensional image data D, the flight hindrance range R1 of other aircrafts AP and the flight hindrance range R2 of the bad weather BW may be designed to be so colored as to allow a plurality of regions R1$a$ and R2$a$ to have different colors; more risky regions of the regions R1$a$ and R2$a$ may be designed to be darker-colored regions. However, the plurality of regions R1$a$ and R2a may have the same color as long as the regions R1a and R2a are illustrated in display states different from one another. For example, the regions may be illustrated in dot patterns having different fine densities.

Further, the own aircraft flight plane F may be divided to have a grid shape with a plurality of grid lines arranged at a predetermined interval in a traveling direction of the own aircraft and a direction orthogonal thereto. The own aircraft flight plane F may be expressed only by the plurality of grid lines. Moreover, the own position of the aircraft 1 may be indicated by a mark such as "Δ (white triangle)" so as to make the traveling direction to be understood.

The controller 17 may supply the generated three-dimensional image data D to the display 130 of the display unit 13, thereby causing the display 130 to stereoscopically display the own position of the aircraft 1, the flight hindrance range, and the flight hindrance cross-section, as the three-dimensional image.

Thus, as illustrated in FIG. 3A, when, for example, other aircraft AP is only set as the flight hindrance factor to be displayed, the controller 17 may three-dimensionally display the own position of the aircraft 1, the flight hindrance range R1 caused by each of other aircrafts AP, the own aircraft flight plane F, and the flight hindrance cross-section C1 of other aircraft AP. The flight hindrance cross-section C1 is a portion at which the flight hindrance range R1 and the own aircraft flight plane F intersect each other. In this case, a boundary, of the flight hindrance cross-section C1, which runs across the plurality of regions R1a in the flight hindrance range R1 may be preferably displayed in a highlighted manner so as to be determinable.

As illustrated in FIG. 3B, when the bad weather BW is set as the flight hindrance factor to be displayed, the controller 17 may three-dimensionally display the own position of the aircraft 1, the flight hindrance range R2 of the bad weather BW, the own aircraft flight plane F, and the flight hindrance cross-section C2 of the bad weather BW. As illustrated in FIG. 3C, when the no-fly zone NZ is set as the flight hindrance factor to be displayed, the controller 17 may three-dimensionally display the own position of the aircraft 1, the no-fly range of the no-fly zone NZ, the own aircraft flight plane F, and the no-fly cross-section C3.

Figure 4:
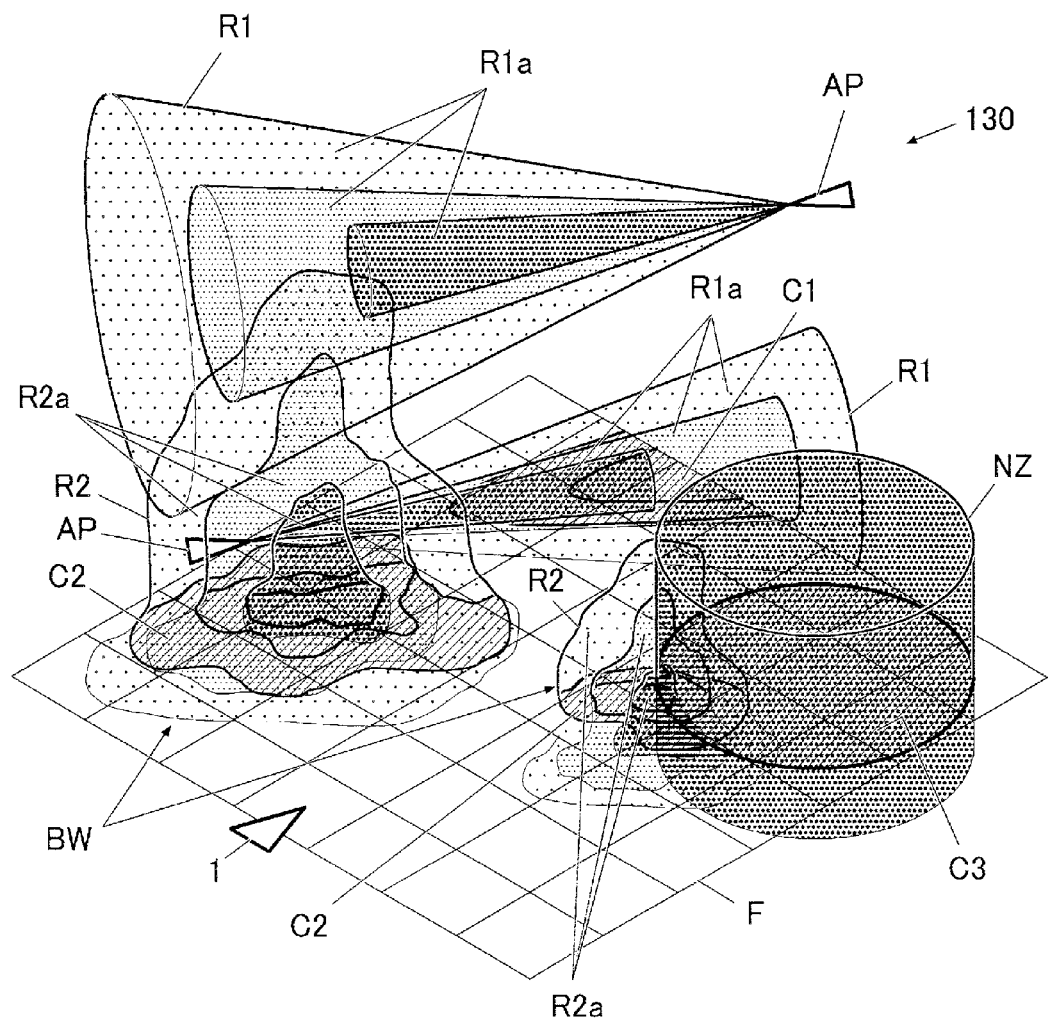
FIG. 4 illustrates a display example of a display in the flight hindrance display process.

As illustrated in FIG. 4, when all of the three flight hindrance factors: other aircraft AP, the bad weather BW, and the no-fly zone NZ are set to be displayed, the controller 17 may three-dimensionally display the respective flight hindrance ranges and the respective flight hindrance cross-sections of the three flight hindrance factors together with the own position of the aircraft 1 and the own aircraft flight plane F as common elements.

[Effects]

As described above, according to the present implementation, the display 130 may stereoscopically display the own position of the aircraft 1, the spatial range of the flight hindrance factor (flight hindrance range), and the flight hindrance cross-section which intersects the own aircraft flight plane F and is included in the flight hindrance range.

Displaying the flight hindrance cross-section in this manner may allow for display of an image with a sense of distance, thus enabling the pilot to easily grasp information such as a distance from the own aircraft to the flight hindrance factor and a size of the flight hindrance factor, only with the sight of the display 130.

Hence, it becomes possible to enhance the recognizability of the pilot to recognize the flight hindrance factor.

Moreover, it becomes possible for the display 130 to display the own position of the aircraft 1, the spatial range of the flight hindrance factor, and the flight hindrance cross-section in a future time, thus enabling the pilot to recognize a situation that may occur in the future and to immediately perform, for example, an avoidance flight of the own aircraft with respect to the flight hindrance factor.

Moreover, the flight hindrance range R1 of other aircraft AP may be divided into the plurality of regions R1a depending on the risks, and the plurality of regions R1a may be displayed by the display 130 in display states different from one another. The flight hindrance range R2 of the bad weather BW may be divided into the plurality of regions R2a depending on the risks, and the plurality of regions R2a may be displayed by the display 130 in display states different from one another.

This enables the pilot to accurately recognize the risks of other aircraft AP and the bad weather BW which may affect the flight of the own aircraft.

Moreover, the own aircraft flight plane F including the vector of the flight direction of the aircraft 1 may be displayed by the display 130 while being divided to have a grid shape with a plurality of grid lines in the traveling direction of the aircraft 1 and the direction orthogonal thereto.

This enables the pilot to easily grasp a sense of distance on the display 130 using the grid lines on the own aircraft flight plane F as scales.

Moreover, the display contents including the own position of the aircraft 1, the spatial range of the flight hindrance factor, and the flight hindrance cross-section may be displayed by the display 130 as the three-dimensional image (stereoscopically-viewed image), thus enabling the pilot to grasp the sense of distance on the display 130 more easily.

[Modifications]

It is to be noted that the technology is not limitedly applicable to the foregoing implementations. It should be appreciated that modifications and alterations may be made by persons skilled in the art without departing from the scope as defined by the appended claims.

For example, the implementation has been described above in which the display 130 may be the three-dimensional display that allows for display of a three-dimensional image (stereoscopically-viewed image). However, the display 130 may be any display as long as the display 130 allows for stereoscopic display of a surrounding situation. Even when the display 130 is designed to allow for display of the three-dimensional image, the display 130 may be designed to be, for example, a head-mounted display, instead of the three-dimensional display.

Moreover, the flight hindrance factor that may be displayed by the display 130 is not limited to the three factors of other aircraft AP, the bad weather BW, and the no-fly zone NZ. For example, geography such as mountains as well as ground facilities may also be displayed by the display 130, for example, when the aircraft 1 flies at a low altitude.

The invention claimed is:

1. A flight hindrance display apparatus comprising:
   circuitry configured to
      acquire surrounding information of an aircraft, the surrounding information being related to a hindrance factor which is a possible flight hindrance to the aircraft,
      determine a spatial range of the flight hindrance factor on a basis of the acquired surrounding information,
      determine a flight hindrance cross-section that intersects a plane including a vector of a flight direction of the aircraft and is included in the determined spatial range of the flight hindrance factor, and cause a display unit to stereoscopically display an own position of the aircraft, the spatial range of the flight hindrance factor, and the flight hindrance cross-section.

2. The flight hindrance display apparatus according to claim 1, wherein
the surrounding information acquired includes future prediction information,
the spatial range of the flight hindrance factor is determined at respective times from a current time to a predetermined future time,
the flight hindrance cross-section is determined at the respective times from the current time to the predetermined future time, and
the display unit is caused to display the own position of the aircraft, the spatial range of the flight hindrance factor, and the flight hindrance cross-section at a predetermined time out of the respective times from the current time to the predetermined future time.

3. The flight hindrance display apparatus according to claim 1, wherein
the spatial range of the flight hindrance factor is divided into a plurality of regions depending on a risk that affects flight of the aircraft, and
the display unit is caused to display the spatial range of the flight hindrance factor while expressing the plurality of regions in display states different from one another.

4. The flight hindrance display apparatus according to claim 2, wherein
the spatial range of the flight hindrance factor is divided into a plurality of regions depending on a risk that affects flight of the aircraft, and
the display unit is caused to display the spatial range of the flight hindrance factor while expressing the plurality of regions in display states different from one another.

5. The flight hindrance display apparatus according to claim 1, wherein the display unit is caused to display the plane including the vector of the flight direction of the aircraft in a grid state divided with a plurality of grid lines in a traveling direction of the aircraft and a direction orthogonal to the traveling direction of the aircraft.

6. The flight hindrance display apparatus according to claim 2, wherein the display unit is caused to display the plane including the vector of the flight direction of the aircraft in a grid state divided with a plurality of grid lines in a traveling direction of the aircraft and a direction orthogonal to the traveling direction of the aircraft.

7. The flight hindrance display apparatus according to claim 3, wherein the display unit is caused to display the plane including the vector of the flight direction of the aircraft in a grid state divided with a plurality of grid lines in a traveling direction of the aircraft and a direction orthogonal to the traveling direction of the aircraft.

8. The flight hindrance display apparatus according to claim 4, wherein the display unit is caused to display the plane including the vector of the flight direction of the aircraft in a grid state divided with a plurality of grid lines in a traveling direction of the aircraft and a direction orthogonal to the traveling direction of the aircraft.

9. The flight hindrance display apparatus according to claim 1, wherein
the display unit is caused to display, as the three-dimensional image, a display content including the own position of the aircraft, the spatial range of the flight hindrance factor, and the flight hindrance cross-section.

10. The flight hindrance display apparatus according to claim 2, wherein
the display unit is caused to display, as the three-dimensional image, a display content including the own position of the aircraft, the spatial range of the flight hindrance factor, and the flight hindrance cross-section.

11. The flight hindrance display apparatus according to claim 3, wherein
the display unit is caused to display, as the three-dimensional image, a display content including the own position of the aircraft, the spatial range of the flight hindrance factor, and the flight hindrance cross-section.

12. The flight hindrance display apparatus according to claim 4, wherein
the display unit is caused to display, as the three-dimensional image, a display content including the own position of the aircraft, the spatial range of the flight hindrance factor, and the flight hindrance cross-section.

13. The flight hindrance display apparatus according to claim 1, wherein the flight hindrance factor is one or more of any other aircraft, bad weather, and a no-fly zone.

14. The flight hindrance display apparatus according to claim 2, wherein the flight hindrance factor is one or more of any other aircraft, bad weather, and a no-fly zone.

15. The flight hindrance display apparatus according to claim 3, wherein the flight hindrance factor is one or more of any other aircraft, bad weather, and a no-fly zone.

16. The flight hindrance display apparatus according to claim 4, wherein the flight hindrance factor is one or more of any other aircraft, bad weather, and a no-fly zone.

17. A flight hindrance display method comprising:
acquiring surrounding information of an aircraft, the surrounding information being related to a flight hindrance factor which is a possible flight hindrance to the aircraft;
determining a spatial range of the flight hindrance factor on a basis of the acquired surrounding information;
determining a flight hindrance cross-section that intersects a plane including a vector of a flight direction of the aircraft and is included in the determined spatial range of the flight hindrance factor; and
causing a display unit to stereoscopically display an own position of the aircraft, the spatial range of the flight hindrance factor, and the flight hindrance cross-section.

18. A non-transitory tangible computer readable medium having a flight hindrance factor program, the program causing, when executed by a flight hindrance display apparatus, the flight hindrance display apparatus to function as:
an information acquiring unit that acquires surrounding information of an aircraft, the surrounding information being related to a flight hindrance factor which is a possible flight hindrance to the aircraft;
a range determining unit that determines a spatial range of the flight hindrance factor on a basis of the surrounding information acquired by the information acquiring unit;
a cross-section determining unit that determines a flight hindrance cross-section that intersects a plane including a vector of a flight direction of the aircraft and is included in the spatial range of the flight hindrance factor determined by the range determining unit; and
a display controller that causes a display unit to stereoscopically display an own position of the aircraft, the spatial range of the flight hindrance factor, and the flight hindrance cross-section.

* * * * *